United States Patent [19]

Nishio et al.

[11] Patent Number: 5,405,902
[45] Date of Patent: Apr. 11, 1995

[54] THERMOPLASTIC RESIN COMPOSITIONS OF POLYPHENYLENE ETHER, CRYSTALLINE THERMOPLASTIC RESINS AND MUTUAL COMPATIBILIZERS HAVING A DEFINED MORPHOLOGY

[75] Inventors: Taichi Nishio; Takashi Sanada; Satoru Hosoda, all of Chiba; Kenji Kagaoka, Osaka; Takayuki Okada, Chiba, all of Japan

[73] Assignee: Sumitomo Chemical Company, Ltd., Osaka, Japan

[21] Appl. No.: 166,813

[22] Filed: Dec. 15, 1993

Related U.S. Application Data

[60] Division of Ser. No. 23,422, Feb. 23, 1993, which is a continuation of Ser. No. 380,031, Jul. 14, 1989, abandoned, which is a division of Ser. No. 102,528, Sep. 29, 1987, abandoned.

Foreign Application Priority Data

Sep. 30, 1986 [JP] Japan .................. 61-233721

[51] Int. Cl.⁶ .................. C08L 23/12; C08L 59/00; C08L 71/12
[52] U.S. Cl. .................. 525/64; 525/68; 525/74; 525/132; 525/149; 525/390; 525/391; 525/395; 525/396; 525/397; 525/905
[58] Field of Search .......... 525/64, 66, 68, 132, 525/397, 74, 149, 390, 391, 395, 396, 905

[56] References Cited

U.S. PATENT DOCUMENTS

| | | | |
|---|---|---|---|
| 3,306,875 | 2/1967 | Hay | 528/215 |
| 4,309,513 | 1/1982 | Ueno et al. | 525/68 |
| 4,315,086 | 2/1982 | Ueno et al. | 525/391 |
| 4,369,278 | 1/1983 | Kosahara et al. | 525/68 |
| 4,537,929 | 8/1985 | Nangrani | 525/66 |
| 4,681,915 | 7/1987 | Bates et al. | 525/148 |
| 4,713,416 | 12/1987 | Del Giudice et al. | 525/92 |
| 4,806,297 | 2/1989 | Brown et al. | 525/92 |
| 4,978,715 | 2/1989 | Brown et al. | 525/92 |
| 5,079,297 | 1/1992 | Brown et al. | 525/92 |

FOREIGN PATENT DOCUMENTS

| | | |
|---|---|---|
| 0030417 | 6/1981 | European Pat. Off. |
| 104543 | 4/1984 | European Pat. Off. |
| 0142166 | 5/1985 | European Pat. Off. |
| 0202430 | 11/1986 | European Pat. Off. |
| 2354368 | 6/1977 | France |
| 2372864 | 6/1978 | France |
| 8700850 | 8/1986 | WIPO |

*Primary Examiner*—Thomas Hamilton, III
*Attorney, Agent, or Firm*—Cushman Darby & Cushman

[57] ABSTRACT

A novel thermoplastic resin composition excellent in heat resistance, mechanical properties and processability is provided which comprises a composition containing (A) a dispersing phase of polyphenylene ether obtained by oxidation polymerization of at least one phenol compound represented by the formula:

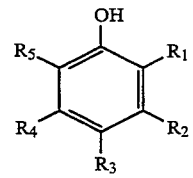

wherein $R_1$, $R_2$, $R_3$, $R_4$ and $R_5$ each represents a hydrogen atom, a halogen atom or a substituted or unsubstituted hydrocarbon residue and at least one of them is a hydrogen atom and (B) a crystalline thermoplastic resin matrix phase and (C) a mutual compatibilizer compatible with (A) and/or (B), an average particle diameter in said dispersing phase having of 0.01–10μ.

15 Claims, No Drawings

THERMOPLASTIC RESIN COMPOSITIONS OF POLYPHENYLENE ETHER, CRYSTALLINE THERMOPLASTIC RESINS AND MUTUAL COMPATIBILIZERS HAVING A DEFINED MORPHOLOGY

RELATED APPLICATIONS

This is a divisional application of U.S. application Ser. No. 08/023,422, filed Feb. 23, 1993, which is a continuation of U.S. application Ser. No. 07/380,031, filed Jul. 14, 1989, (now abandoned), which was a divisional of application Ser. No. 07/102,528, filed Sep. 29, 1987, (now abandoned).

FIELD OF THE INVENTION

This invention relates to a novel thermoplastic resin composition suitable for shaped articles, sheet or film by injection molding or extrusion molding. More particularly, it relates to a novel thermoplastic resin composition superior in heat resistance, mechanical properties and processability, which contains a mutual compatibilizer in a resin composition containing a dispersing phase of polyphenylene ether and a crystalline thermoplastic resin matrix phase.

BACKGROUND OF THE INVENTION

Polyphenylene ether is thermoplastic resin superior in various mechanical properties, heat resistance, electrical properties, chemical resistance, hot water resistance, flame resistance and dimension stability, but inferior in processability due to high melt viscosity and relatively inferior in impact resistance.

A composition material comprising polyphenylene ether and polystyrene is proposed in order to lessen melt viscosity of polyphenylene ether and to improve processability thereof, leaving various other good properties of polyphenylene ether unchanged. However, such inherent good properties of polyphenylene as heat resistance, flame resistance and chemical resistance are somewhat damaged when enough polystyrene is added to provide processability practically. No sufficient improvement is seen in impact resistance, either, even after polystyrene is added.

On the other hand, crystalline thermoplastic resins are usually superior in heat resistance, stiffness, strength and oil resistance, but are inferior in impact resistance in many cases. In order to improve the impact strength of the resins, rubber components are blended or copolymerized therewith to result in much reduction of heat resistance and surface hardness. Further, crystalline thermoplastic resins when molten decrease in viscosity and can readily be molded. However, when they are molded at temperatures even slightly lower than their crystallizing solidification temperature, they are rapidly hardend and thus are narrow in range of molding conditions. Moreover, they are conspicuous in change of properties and size at practical use. Further, most of heat resistant crystalline thermoplastic resins are high in susceptibility to water and not only change in properties and dimension, but are inferior in appearance.

Development is expected in new applications if a resin composition is prepared in which polyphenylene ether and a crystalline thermoplastic resin are blended, maintaining favorite properties of both components and having improved processability and impact strength. However, polyphenylene ether and crystalline thermoplastic resin are greatly different in melt viscosity from each other and they are very poor in compatibility. Simple blending of them encounters the following difficulties:

1. hardness in stable take-up of strands extruded and greatly lower processability in molding, because their melt viscosity difference is very large; and
2. no improvement in mechanical properties of the shaped articles, particularly in impact resistance, but rather lower than expected on the basis of their respective values.

One approach to solve these problems is addition of additives having reactivity or compatibility to system of polyphenylene ether and polyamide as disclosed in Japanese Patent Publication (Kokoku) No. 60-11966 and Japanese Patent Publication (Kokai) Nos. 56-47432, 57-10642 and 60-58463. Especially, the methods disclosed in Japanese Patent Publication (Kokoku) No. 60-11966 and Japanese Patent Publication (Kokai)No. 56-47432 afford good effect, but impact strength is still not enough.

Furthermore, Japanese Patent Publication (Kokai) Nos. 56-49753, 57-10642, 57-165448 and 59-66452 disclose use of additives reactive with modified polystyrene, polyphenylene ether or rubber. However, disperse phase is not clear and even when polyphenylen ether is disperse phase, no mention is made of particle size. Such composition is out of balance between impact resistance and heat resistance and besides improvement of impact resistance is still not sufficient.

After a study on a resin composition of polyphenylene ether and crystalline thermoplastic resin, we have found that a resin composition having good balance between heat resistance and impact resistance, markedly improved impact resistance and superior processability is obtained by adding a mutual compatibilizer (C) to a composition of a polyphenylene ether disperse phase (A) and a crystalline thermoplastic resin matrix phase (B) with specifying particle size of said disperse phase.

That is, this invention relates to a thermoplastic resin composition which comprises a composition comprising (A) a dispersing phase, (B) matrix phase and (C) a mutual compatibilizer defined below and in which average particle size in the dispersing phase is 0.01–10µ:

(A): a dispersing phase comprising polyphenylene ether obtained by oxidation polymerization of at least one phenol compound represented by the formula:

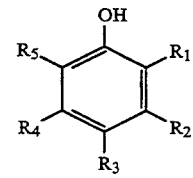

wherein $R_1$, $R_2$, $R_3$, $R_4$ and $R_5$ each represents a hydrogen atom, a halogen atom or a substituted or unsubstituted hydrocarbon residue and at least one of them is a hydrogen atom;

(B) a crystalline thermoplastic resin matrix phase; and
(C) a mutual compatibilizer compatible with (A) and-/or (B).

Polyphenylene ether for (A) is polymer obtained, for example, by oxidation polymerization of one or more of phenol compounds having the formula:

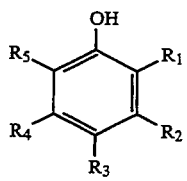

wherein $R_1$, $R_2$, $R_3$, $R_4$ and $R_5$ each represents a hydrogen atom, a halogen atom or a hydrocarbon residue substituted or not and at least one of them is a hydrogen atom, with molecular oxygen or gas containing the same in the presence of an oxidation coupling catalyst.

Examples of $R_1$–$R_5$ are a hydrogen atom, a chlorine atom, a bromine atom, a fluorine atom, an iodine atom, a methyl group, an ethyl group, an n- or iso-propyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group or an allyl group.

Examples of phenol compound are phenol, o-, m-or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t. butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxydation coupling catalyst may be employed for oxydation Polymerization of phenol compound, as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primary amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization) or lower (low temperature polymerization). Either temperature may be used, although polymers produced thereby have different properties.

Polyphenylene ether for (A) further includes that grafted with styrenic polymer or other polymer. For instance, grafted one is obtained by graft-polymerizing styrene monomer and/or other comonomer in the presence of polyphenylene ether and organic peroxide (Japanese Patent Publications (Kokoku) 47-47862, 48-12197, 49-5623, 52-38596 and 52-30991) or by melt-kneading polyphenylene ether and polystyrene in the presence of a radical initiator (Japanese Patent Publication (Kokai) 52-142799).

Reduced viscosity of polyphenylene ether for (A) measured in a 0.5 g/dl chloroform solution at 25° C. is preferably 0.40–0.60, more preferably 0.45–0.55. When reduced viscosity is less than 0.40 or more than 0.60, impact strength of the composition decreases.

Crystalline thermoplastic resin matrix phase (B) comprises at least one resin selected from polyethylene, polypropylene, polyamide thermoplastic polyester, polyacetal, polyphenylene sulfide and polyether ether ketone.

Said polyethylene is crystalline polyethylene and includes low-density polyethylene, medium-density polyethylene, high-density polyethylene, straight chain low-density polyethylene, etc.

Said polypropylene is crystalline polypropylene and includes homopolymer of propylene and besides block or random copolymers of propylene with, for example, α-olefins such as ethylene and butene-1.

Preferably, said polypropylene have a melt index of 0.1–100 g/10 min., especially 0.5–40 g/10 min.

Homopolymer and block or random copolymers of propylene is able to obtain by reaction in the presence of, for example, a catalyst comprising titanium trichloride and an alkylaluminum compound usually called Ziegler-Natta catalyst.

As the polyamides, there may be used those obtained by polycondensation of lactams of three or more membered rings, polymerizable ω-amino acids, dibasic acids with diamines, etc. As typical examples thereof, mention may be made of polymers of ε-caprolactam, aminocaproic acid, enantholactam, 7-aminoheptanoic acid, 11-aminoundecanoic acid, etc., polymers obtained by polycondensation of diamines such as hexamethylenediamine, nonamethylenediamine, undecamethylenediamine, dodecamethylenediamine, m-xylylenediamine, etc. with dicarboxylic acids such as terephthalic acid, isophthalic acid, adipic acid, sebacic acid, dibasic dodecanoic acid, glutaric acid, etc., or copolymers thereof.

Typical examples of said polyamides are aliphatic polyamides such as polyamide 6, polyamide 6,6, polyamide 6,10, polyamide 11, polyamide 12, polyamide 6,12, etc. and aromatic polyamides such as polyhexamethylenediamine terephthalamide, polyhexamethylenediamine isophthalamide, xylene group-containing polyamides, etc. These may also be used as mixtures or copolymers of two or more of them.

Said thermoplastic polyesters comprise dicarboxylic acid component of which at least 40 mol % is terephthalic acid and diol component. The dicarboxylic acid component other than terephthalic acid includes aliphatic dicarboxylic acids of 2–20 carbon atoms such as adipic acid, sebacic acid, dodecanedicarboxylic acid, etc., aromatic dicarboxylic acids such as isophthalic acid, naphthalenedicarboxylic acid, etc. and alicyclic dicarboxylic acids such as cyclohexanedicarboxylic acid, etc. These may be used alone or in combination of two or more. As said diol components, mention may be made of, for example, aliphatic glycols, alicyclic glycols and aromatic glycols such as ethylene glycol, 1,3-propanediol, 1,4-butanediol, 1,6-hexanediol, 1,10-decanediol, 1,4-cyclohexanediol, 4,4'-dihydroxydiphenyl, etc. They may be used alone or in combination of two or more.

Of these thermoplastic polyesters, especially preferred are polybutylene terephthalate and polyethylene terephthalate. Preferably, they have an intrinsic viscosity within the range of 0.5–3.0 measured in o-chlorophenol as a solvent at 25° C. and those of intrinsic viscosity outside said range cannot provide the desired mechanical strength.

The mutual compatibilizer (C) is such that compatible with the polyphenylene ether dispersing phase (A) and/or the crystalline thermoplastic resin matrix phase (B) and has a function to stabilize each of said phases and does not cause poor appearance or deterioration of properties due to unstable phases at actual use.

As the mutual compatibilizer, surface active agents of low molecular weight and soaps may also be used, but those of high molecular weight are preferred for obtaining stability of the phases. More preferred are those which can react, even partially, with either one or both of the phases and have not mere affinity therewith, regardless of high molecular weight or low molecular weight. Further preferably, the mutual compatibilizer per se has affinity with or is able to react with (A) and/or (B) and has impact absorbing capacity.

As the mutual compatibilizer of low molecular weight, there may be used at least one compound selected from compounds containing, in the molecule, at least one of carboxyl group, acid anhydride group, acid amide group, imide group, carboxylate group, epoxy group, amino group, isocyanate group, group having oxazoline ring and hydroxyl group. Examples of these compounds are aliphatic carboxylic acids, aromatic carboxylic acids, esters, acid anhydrides and acid amides of these acids, imides derived from these acids and/or acid anhydrides, aliphatic glycols or phenols, isocyanates such as toluene diisocyanate and methylenebis(4-phenyl isocyanate), oxazolines such as 2-vinyl-2-oxazoline, epoxy compounds such as epichlorohydrin and glycidyl methacrylate, aliphatic amines, aliphatic diamines, aliphatic triamines, aliphatic tetramines, aromatic amines such as m-phenylenediamine, 4,4'-methylenedianiline, benzidine, etc. The following unsaturated compounds are more preferred.

Typical examples are maleic anhydride, maleic acid, fumaric acid, maleimide, maleic acid hydrazide, a reaction product of maleic anhydride and diamine, e.g., compounds having the formulas

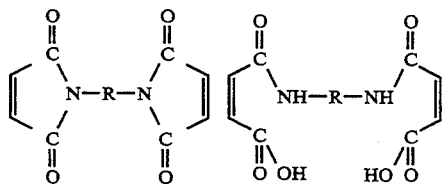

wherein R is an aliphatic or aromatic group, methylnadic anhydride, dichloromaleic anhydride, maleic acid amide and, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; unsaturated carboxylic acid such as acrylic acid, butenoic acid, crotonic acid, vinyl acetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienic acid, 2,4-hexadienic acid, diallyl acetic acid, geranic acid, 2,4-decadienic acid, 2,4-dodecadienic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; ester, acid amide or anhydride of these or unsaturated carboxylic acid above; unsaturated oxazoline; unsaturated alcohol such as allyl alcohol, crotyl alcohol, methylvinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohol of the formula: $C_nH_{2n-5}OH$, $C_nH_{2n-7}OH$ or $C_nH_{2n-9}OH$ (n is an integer), 3-butene-1,2-diol, 2,5-dimethyl-3-hexene-2,5-diol, 1,5-hexadiene-3,4-diol or 2,6-octadiene-4,5-diol; and unsaturated amine such as that where an OH group of the unsaturated alcohol is replaced by an $-NH_2$ group.

Isocyanates such as toluene diisocyanate and methylenediphenyl diisocyanate are also included. There may be further included various polymers and rubbers of low molecular weight (e.g., 500–10,000) into which said compatibilizing agents are introduced.

Mutual compatibilizer of high molecular weight includes polymers of high molecular weight (e.g., more than 10,000) into which said compatibilizers of low molecular weight are introduced. Preferred are polyethylene, polypropylene and polyolefin copolymers such as ethylene-propylene coplymer and ethylene-butene copolyers, and above mentioned polyamides, thermoplastic polyesters, and polyphenylene sulfide, polyacetal and polyether ether ketone into which compatibilizing agent of low molecular weight is introduced. These polymers include those copolymerized with other components. Further preferred is at least one selected from modified rubber-like material and epoxy compounds.

"Modified rubber-like materials" in this invention mean those obtained by modification of rubber-like materials.

"Rubber-like material" in this invention mean natural and synthetic polymer materials which are elastic at room temperature.

As examples of the rubber-like materials, mention may be made of natural rubber, butadiene polymer, butadiene-styrene copolymer (including all of random copolymers, block copolymers, graft copolymers, etc.), isoprene polymer, chlorobutadiene polymers, butadiene-acrylonitrile copolymer, isobutylene polymer, isobutylene-butadiene copolymer, isobutylene-isoprene copolymer, acrylate ester copolymer, ethylene-propylene copolymer, ethylene-butene copolymer, ethylene-propylene-diene copolymer, Thiokol rubber, polysulfide rubber, polyurethane rubber, polyether rubber e.g., polypropylene oxide, epichlorohydrin rubber, polyester elastomer, polyamide elastomer, etc.

These rubber-like materials may be produced by any methods (e.g., emulsion polymerization, solution polymerization, etc.) and with any catalysts (e.g., peroxides, trialkylaluminum, lithium halides, nickel catalysts).

Furthermore, there may be also used those which have various crosslinking degrees, various proportions of micro structures (e.g., cis structure, trans structure, vinyl group, etc.) or various average rubber particle sizes.

Various polymers such as random compolymers, block copolymers, graft copolymers, etc. may be used as the copolymers for rubber-like materials in this invention.

Modification of rubber-like materials may be effected by any methods of introduction of at least one mutual compatibilizer of low molecular weight mentioned above. Generally, this is effected by copolymerization (including all of random copolymerization, block copolymerization, graft copolymerization, etc.) and raction with main chain, side chain and terminal of molecule.

Epoxy compound includes epoxy resin and precursors thereof and epoxy group-containing copolymer. Examples of epoxy resin and its precursors are bisphenol A epoxy resin, O-cresol novolac epoxy resin, glycidylamine epoxy resin, three-functional epoxy resin and four-functional epoxy resin. The epoxy compound may further contain a reactive diluent.

Epoxy group-containing copolymer includes, for example, unsaturated epoxy compound/ethylenically unsaturated compound copolymer, epoxidized polyester and epoxidized polyamide. Unsaturated epoxy compound used for the unsaturated epoxy compound/ethylenically unsaturated compound copolymer has in a molecule both an epoxy group and an unsaturated group which is copolymerizable with the ethylenically unsaturated compound, for instance, unsaturated glycidyl ester and unsaturated glycidyl ether having the formulas (1) and (2) below:

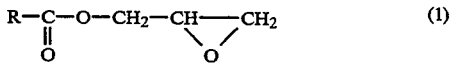 (1)

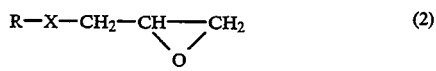 (2)

wherein R is a $C_2$-$C_{18}$ hydrocarbon group containing ethylenically unsaturated bond and X is —$CH_2$—O— or

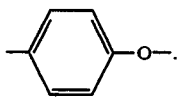

Examples are glycidyl acrylate, glycidyl methacrylate, glycidyl itaconate, allylglycidyl ether, 2-methylallyl glycidyl ether, styrene-p-glycidyl ether. The ethylenically unsaturated compound is olefin, vinyl ester of $C_2$-$C_6$ saturated carboxylic acid, $C_1$-$C_8$ saturated alcohol/acrylic or methacrylic acid ester, maleate, methacrylate, fumarate, halogenated vinyl, styrene, nitrile, vinyl ether or acrylamide. Examples are ethylene, propylene, butene-1, vinyl acetate, methyl acrylate, ethyl acrylate, methyl methacrylate, diethyl malate, diethyl fumarate, vinyl chloride, vinylidene chloride, styrene, acrylonitrile, isobutyl vinyl ether and acrylamide. They are used singly or in a mixture of at least two of them. Ethylene is preferable most of all.

Composition ratio in the epoxy group-containing copolymer is not critical, but 0.1-50% by weight, more preferably 1-30% by weight of unsaturated epoxy compound is preferred.

The epoxy group-containing copolymer is prepared by various methods. Either random copolymerization or graft copolymerization may be effected; in the former, unsaturated epoxy compound is introduced in backbone chain of copolymer, and in the latter, unsaturated epoxy compound is introduced in side chain of copolymer. Examples are copolymerization in which unsaturated epoxy compound is allowed to react with ethylene in the presence of a radical initiator under 500–4000 atm. at 100°–300° C. in the presence or absence of a solvent and a chain transfer agent; graft copolymerization in which polypropylene, unsaturated epoxy compound and a radical initiator are blended and allowed to melt in an extruder; and copolymerization in which unsaturated epoxy compound is allowed to react with ethylenically unsaturated compound in an inert solvent such as water or an organic solvent in the presence of a radical initiator.

Copolymer of unsaturated epoxy compound/ethylenically unsaturated compound is preferable, particularly, copolymer of unsaturated epoxy compound/ethylene/other ethylenically unsaturated compound than ethylene.

Compositional ratio in the resin composition comprising (A) dispersing phase of polyphenylene ether, (B) crystalline thermoplastic matrix phase and (C) mutual compatibilizer compatible with (A) and/or (B) is preferably (A) 1–65%, (B) 35–98.9% and (C) 0.1–50%, more preferably (A) 1–60%, (B) 40–98.9% and (C) 0.1–30% and most preferably (A) 1–60%, (B) 40–98.9% and (C) 0.1–20% (wherein % is by weight). When (A) is less than 1% by weight, the composition is inferior in heat resistance, dimension stability and processability and when more than 65% by weight, dispersing phase is not formed and impact strength and processability are inferior. When (B) is less than 35% by weight, matrix phase is not formed and impact strength and processability are deteriorated. When (B) is more than 98.9% by weight, heat resistance, dimension stability, hygroscopicity and processability are not improved. When (C) is less than 0.1% by weight, the phases become unstable and impact strength decreases. When (C) is more than 50% by weight, gelation proceeds to deteriorate processability and besides, the matrix (B) is hardly formed and phase is unstable to reduce impact strength.

Average particle size in the polyphenylene ether dispersing phase (A) is suitably 0.01–10μ, preferably 0.05–5μ, more preferably 0.05–3μ. Further preferred particle size is 0.1–2μ, more preferably 0.1–1.8μ. When the particle size is outside the above range, impact strength decreases.

The resin composition of this invention may further contain (D) fibrous reinforcing composites having an aspect ratio (ratio of major axis and minor axis) of at least 10 such as glass fiber, carbon fiber, polyamide fiber and metallic whisker or (E) inorganic filler (excluding fibrous filler) having an average particle size of 10μ or less such as silica, alumina, calcium carbonate, talc, mica, carbon black, $TiO_2$ and ZnO.

In case the fibrous reinforcing composite material (D) or the inorganic filler (E) is added, addition amount thereof is 1–50 parts by weight per 100 parts by weight of the resin composition comprising (A) disperse phase comprising polyphenylene ether, (B) crystalline thermoplastic resin matrix phase and (C) mutual compatibilizer.

One preferred embodiment of this invention may be to use the resin composition in the form of composite material wherein flame retardants such as $Sb_2O_3$ or flame retardant aids; lubricants; nuclear agents; plasticizers; dyes; pigments; antistatic agents; antioxidants; weatherability providing agents, etc. are added.

Any process is used to prepare the present resin composition.

Melt-blending methods for the components are the best from an economical point of view, although it is possible to blend the components in a solution and evaporate the solvent or precipitate in a non-solvent. Melt-blending is carried out in a single-screw or a twin-screw extruder, a kneader or so, preferably a high-speed twin-screw extruder.

Before kneading, it is preferable to uniformly blend powder or pellets of the component resins in a tumbler or a Henschel mixer. The first blending above is not always necessary. Alternatively, each resin may be fed to a kneader through a metering apparatus. Resin composition, after kneaded, is molded according to injection, extrusion and the like. Alternatively, dry blending the resin materials at the injection or extrusion molding without prekneading and direct kneading are made in the melt processing to produce a shaped article. Any order is used in the kneading step. For example, compounds for (A) and (B), and (C) are kneaded together, or compounds for (A) and (B) are first kneaded before (C) is kneaded or compounds for (A) and (C) are first kneaded before compound for (B) is kneaded. However, it is not desirable to knead compounds for (B) and (C) and then add compound for (A), because gellation occurs and desirable resin composition is not produced.

The resin composition of this invention is used as shaped articles, sheets, tubes, films, fibers, laminates, coating materials, etc. made by injection molding or extrusion molding, especially as automobile parts such as bumper, inverness, fender, trim, door panel, wheel cover, side protector, garnish, trunk lid, bonnet, roof, etc., interior and exterior materials and mechanical parts required to have heat resistance. Furthermore, the resin composition is used as parts for motor bicycles such as covering material, muffler cover, leg shield, etc. and electrical and electronic parts such as housing, chassis, connector, base for printed circuit, pulley and other parts required to have strength and heat resistance.

This invention is explained referring to examples below, wherein they are merely illustrative ones and this invention is not limited to them. Heat distortion temperature test (H.D.T.), Izod impact strength test (3.2 mm thick) and M.I. are observed in accordance with JIS K7207, JIS K7110 and JIS K7210, respectively.

Polyphenylene ether, epoxy compounds and modified rubber-like materials used in the examples and comparative examples are obtained below. Crystalline thermoplastic resins and epoxy resins for the epoxy compounds which are commercially available are used.

(1) Polyphenylene ether:

Manganese chloride/ethylenediamine is added to a solution of 2,6-dimethylphenol in toluene and methanol and then the solution is subjected to oxidation polymerization under a molecular oxygen atmosphere at 30° C.

(2) Modified rubber-like material:

A mixture of ethylenepropylene rubber, maleic anhydride and tert-butyl peroxylaurate is extruded from an extruder (screw diameter: 30 mm; L/D=28; barrel temperature: 230° C.; screw rotation: 60 rpm). Modified rubber strands extruded are cooled in water and pelletized.

(3) Epoxy compound:

Glycidyl methacrylate/ethylene/vinyl acetate copolymer is prepared in accordance with Japanese Patent Publications (Kokai) 47-23490 and 48-113883. That is, glycidyl methacrylate, ethylene, vinyl acetate, a radical initiator and a chain-transfer agent are successively fed in a reactor (40 l) made of stainless steel whose temperature is controlable and which is equipped with an inlet, an outlet and a stirrer, and copolymerization is effected under stirring under 1400–1600 atm. at 180°–200° C.

(4) Polyamide:

Polyamide 6,6: UBE Nylon ® 2020B (Ube Industries, Ltd.)

Polyamide 6: UBE Nylon ® 1013B (Ube Industries, Ltd.)

(5) Polyester:

Polybutylene terephthalate: TUFPET ® N-1000 (Mitsubishi Rayon Co., Ltd.)

Polyethylene terephthalate: UNITIKA Polyester MA2101 (Unitika, Ltd.)

(6) Epoxy resin:

SUMIEPOXY ® ELM-434 (Sumitomo Chemical Co., Ltd.); 4-functional epoxy resin, epoxy equivalent=110–130 g/eq.

(7) Oleic acid amide:

DENON SL-1 ® (Marubishi Petrochemical Co., Ltd.)

EXAMPLE 1

40 wt % of polyphenylene ether $\eta sp/c = 0.47$ dl/g (reduced viscosity measured in 0.5 g/dl chloroform at 25° C.), 50 wt % of polyamide 66 "UBE Nylon" ® 2020B and 10 wt % of maleic anhydride grafted ethylene propylene rubber (amount of maleic anhydride grafted: 0.7 wt % of ethylene propylene rubber) were melted and kneaded at resin temperature of 310° C. and screw rotation of 500 rpm in a continuous twin-screw kneader (TEX-44 ® of Nippon Steel Manufacturing Co. Ltd.) and the product was granulated and test specimen were made therefrom by an injection molding machine (IS-150 of Toshiba Co.). Properties of the test specimen were measured. The results are shown in Table 1.

An Izod impact strength test specimen before subjected to the test was subjected to finishing on its cross section by microtome and dipped in carbon tetrachloride which is good solvent for polyphenylene ether for 30 minutes at room temperature to etch polyphenylene ether. This test specimen was examined by a scanning type electron microscope to measure diameter of dispersed particles of polyphenylene ether. Weight average particle size was calculated on the basis of maximum size of each particle. The results are also shown in Table 1.

Comparative Example 1

Example 1 was repeated except that polyphenylene ether of $\eta sp/c = 0.25$ was used. The results are shown in Table 1.

EXAMPLE 2

One part by weight of an epoxy resin "SUMIEPOXY ELM-434" ® as a compatibilizing agent was added to 100 parts by weight of a composition comprising 50 wt % of polyphenylene ether of $\eta sp/c=0.51$ and 50 wt % of polybutylene terephthalate TUFPET® BPT N-1000® and the mixture was melted and kneaded at 360° C. in a small batchwise twin-screw kneader ("LABO-PLASTMIL"® of Toyo Seiki Co.) at a screw rotation of 90 rpm for 5 minutes. The resulting composition was pressed at 270° C. to prepare test specimen for Izod impact strength test and heat distortion temperature test. Results of measurement of properties and average dispersed particle diameter of polhphenylene ether measured by the method of Example 1 are shown in Table 2.

Comparative Example 2

Example 2 was repeated except that one part by weight of oleic acid amide "DENON SL-1"® (Marubishi Petrochemical Co.) was used in place of the epoxy resin as a compatibilizing agent. The results are shown in Table 2.

EXAMPLE 3

Example 2 was repeated using 30 wt % of polyphenylene ether ($\eta sp/c=0.55$), 56 wt % of polyethylene terephthalate "UNITIKA PET" MA2101® and 14 wt % of glycidyl methacrylate-ethylene-vinyl acetate (GMA-E-VA) copolymer. Results of measurement of properties and average dispersed particle diameter are shown in Table 3.

Comparative Example 3

First, 80 wt % of "UNITIKA PET" MA2101® (polyethylene terephthalate) and 20 wt % of GMA-E-VA copolymer which were the same as used in Example 3 were melted and kneaded in "LABOPLAST-MIL"® and then 70 wt % of the resulting composition and 30 wt % of the same polyphenylene ether as used in Example 3 were further kneaded and molded and properties were measured as in Example 3. The results are shown in Table 3.

EXAMPLE 4

Example 2 was repeated using 40 wt % of polyphenylene ether ($\eta sp/c=0.52$), 50 wt % of polyamide 6 "UBE Nylon"® 1013B and 10 wt % of maleic anhydride grafted ethylene propylene rubber. The results are shown in Table 4.

EXAMPLE 5

Example 4 was repeated except that polyamide 66 "UBE Nylon"® 2020B was used in place of polyamide 6. The results are shown in Table 4.

From these examples and comparative examples, it will be seen that Izod impact strength increases with decrease in average particle diameter of disperse phase comprising polyphenylene ether and decreases to a practically unacceptable value when the particle diameter exceeds 10μ and thus the particle diameter of disperse phase of polyphenylene ether is an important factor.

It has been found that this dispersed particle diameter varies depending on molecular weight of polyphenylene ether, kind of the compatibilizing agent and kneading method. These are surprising facts unexpectable from the conventional technique on polyphenylene ether composition.

EXAMPLE 6

Example 1 was repeated except that polyphenylene ether of $\eta sp/c=0.55$ was used. The results are shown in Table 1.

EXAMPLE 7

Example 1 was repeated except that polyphenylene ether of $\eta sp/c=0.57$ was used. The results are shown in Table 1. Surprisingly, it is seen from Table 1 that reduced viscosity of polyphenylene ether has a suitable range and when it is less than 0.40, diameter of dispersed particles increases to cause reduction of Izod impact strength and when it reaches 0.60, the diameter also tends to increase.

EXAMPLE 8

40 wt % of polyphenylene ether ($\eta sp/c=0.47$ dl/g), 50 wt % of polyamide 66 "UBE Nylon"® 2020B and 10 wt % of maleic anhydride grafted ethylene propylene rubber (amount of maleic anhydride: 97 wt % of the ethylene propylene rubber) were kneaded at 260° C. for 5 minutes in a small batchwise twin-screw kneader "LABOPLASTMIL"® at a screw rotation of 90 rpm. The resulting composition was pressed (270° C.) to produce test Specimens and properties thereof were measured. The results are shown in Table 5.

EXAMPLE 9

Example 8 was repeated except that the kneading was effected at 280° C. The results are shown in Table 5.

It is recognized from Examples 8 and 9 that even if composition is the same, particle diameter of disperse phase of polyphenylene ether changes and further impact strength markedly changes with change in kneading conditions. That is, importance of diameter of dispersed particles is clearly shown.

EXAMPLE 10

Example 6 was repeated except that amount of polyamide 66 was changed to 45 wt % and that of glycidyl methacrylate-ethylene-vinyl acetate copolymer (content of glycidyl methacrylate: 10 wt % of the copolymer) was changed to 5 wt %. The results are shown in Table 1.

EXAMPLE 11

50 wt % of polyphenylene ether ($\eta sp/c=0.47$ dl/g), 10 wt % of maleic anhydride grafted ethylene propylene rubber (amount of maleic anhydride grafted: 0.7 wt % of ethylene propylene rubber) and 0.6 part by weight (based on the total composition) of maleic anhydride were introduced into a twin-screw continuous kneader ("TEX-44"® of Nippon Steel Manufacturing Co., Ltd.) from its first hopper and 40 wt % of polyamide 6 "UBE Nylon"® 1013B was introduced from second hopper provided between the first hopper and vent hole and they were melted and kneaded at resin temperature of 310°–340° C. and a screw rotation of 380 rpm and then granulated. Then, test specimens were made by an injection molding machine (IS-150E of Toshiba Machine Co., Ltd.) and properties were measured. The results are shown in Table 6.

EXAMPLE 12

Example 11 was repeated except that ethylene propylene rubber was used in place of maleic anhydride grafted ethylene propylene rubber. The results are shown in Table 6.

Dow Chemical Co.) was used in place of 0.6 part by weight of the maleic anhydride and amount of polyphenylene ether was changed to 40 wt %. The results are shown in Table 6.

EXAMPLE 13

TABLE 1

| | A Polyphenylene ether | B Polyamide UBE Nylon ® 2020B | C Modified rubber Maleic anhydride grafted EPR | C Epoxy group containing copolymer | M.I. 280° C. 10 Kg load | Izod Impact (notched) Kg·cm/cm | H.D.T. (18.6 Kg/cm$^2$) | Average particle diameter of polyphenylene ether ($\mu$) | Note |
|---|---|---|---|---|---|---|---|---|---|
| Example 1 | 40 wt % | 50 wt % | 10 wt % | —wt % | 8.5 | 12.3 | 119.1 | 2.0 | PPE $\eta sp/c = 0.47$ |
| Comparative Example 1 | 40 | 50 | 10 | — | 49.0 | 4.8 | 114.9 | 15.0 | PPE $\eta sp/c = 0.25$ |
| Example 6 | 40 | 50 | 10 | — | 7.0 | 8.9 | 115.4 | 2.7 | PPE $\eta sp/c = 0.55$ |
| Example 7 | 40 | 50 | 10 | — | 7.0 | 6.5 | 114.9 | 2.9 | PPE $\eta sp/c = 0.57$ |
| Example 10 | 40 | 45 | 10 | *GMA-E-VA copolymer 5 | 2.7 | 15.1 | 108.2 | 1.9 | PPE $\eta sp/c = 0.55$ |

*GMA: Glycidyl methacrylate,
E: Ethylene,
VA: Vinyl acetate

TABLE 2

| | A Polyphenylene ether | B Polybutylene terephthalate | C Compatibilizing agent | M.I. 280° C. 10 Kg load | Izod Impact (notched) Kg·cm/cm | H.D.T. (18.6 Kg/cm$^2$) | Average particle diameter of polyphenylene ether ($\mu$) |
|---|---|---|---|---|---|---|---|
| Example 2 | 50 wt % | 50 wt % | *Part of weight Epoxy resin 1 | 4.9 | 7.7 | 170.1 | 10.0 |
| Comparative Example 2 | 50 | 50 | Oleic amide 1 | 31.2 | 3.7 | 162.0 | 46.8 |

*Amount per 100 parts by weight of (A + B)

TABLE 3

| | A Polyphenylene ether | B Polyethylene terephthalate | C Epoxy group containing copolymer | M.I. 280° C. 10 Kg load | Izod Impact (notched) Kg·cm/cm | H.D.T. (18.6 Kg/cm$^2$) | Average particle diameter of polyphenylene ether ($\mu$) |
|---|---|---|---|---|---|---|---|
| Example 3 | 30 wt % | 56 wt % | GMA-E-VA copolymer 14 wt % | 1.15 | 5.7 | 84 | 5.4 |
| Comparative Example 3 | 30 | 56 | same as above 14 First stage formation of master batch | 96.7 | 2.3 | 112 | 12.8 |

*At the first stage, PET/GMA copolymer = 56/14 wt % were melted and kneaded and then at the second stage 70 wt % of this composition and 30 wt % of PPE were melted and kneaded.

TABLE 4

| | A Polyphenylene ether | B Polyamide | C Modified rubber Maleic anhydride grafted rubber | M.I. 280° C. 2.16 Kg load | Izod Impact (notched) Kg·cm/cm | H.D.T. (18.6 Kg/cm$^2$) | Average particle diameter of polyphenylene ether ($\mu$) |
|---|---|---|---|---|---|---|---|
| Example 4 | 40 wt % | UBE Nylon ® 1013B 50 wt % | 10 wt % | 15.8 | 8.8 | 110 | 8.7 |
| Example 5 | 40 | UBE Nylon ® 2020B 50 wt % | 10 | 0.1 | 19.9 | 112.5 | 1.8 |

Example 12 was repeated except that 10 wt % of 2-vinyl-2-oxazoline grafted polystyrene ("RPS" ®) of

TABLE 5

| | A Polyphenylene ether | B Polyamide UBE Nylon ® 2020B | C Modified rubber Maleic anhydride grafted rubber | Kneading conditions | M.I. | Izod Impact (notched) Kg·cm/cm | Average particle diameter of polyphenylene ether ($\mu$) |
|---|---|---|---|---|---|---|---|
| Example 8 | 40 wt % | 50 wt % | 10 wt % | 260° C. 90 rpm 5 min. | 15.5 | 18.7 | 1.9 |
| Example 9 | 40 | 50 | 10 | 280° C. | 15.9 | 10.1 | 2.5 |

TABLE 5-continued

| A Polyphenylene ether | B Polyamide UBE Nylon ® 2020B | C Modified rubber Maleic anhydride grafted rubber | Kneading conditions | M.I. | Izod Impact (notched) Kg · cm/cm | Average particle diameter of polyphenylene ether (μ) |
|---|---|---|---|---|---|---|
| | | | 90 rpm 5 min. | | | |

TABLE 6

| | A Polyphenylene ether | B Polyamide UBE Nylon ® 1013B | C Rubber | Maleic anhydride | M.I. 280° C. 10 Kg load | Izod Impact (notched) Kg · cm/cm | H.D.T. (°C.) | Average particle diameter of polyphenylene ether (μ) |
|---|---|---|---|---|---|---|---|---|
| Example 11 | 50 wt % | 40 wt % | Maleic anhydride grafted rubber 10 wt % | part by weight 0.6 | 45 | 54 | 115 | 0.5 |
| Example 12 | 50 | 40 | Ethylene propylene rubber 10 wt % | part by weight 0.6 | 47 | 53 | 117 | 0.6 |
| Example 13 | 40 | 40 | Ethylene propylene rubber 10 wt % | "RPS" 10 wt % | 50 | 53 | 115 | 1.0 |

It has been found from the above examples and comparative examples that in composition of polyphenylene ether, crystalline thermoplastic resin and mutual compatibilizer, particle diameter of dispersing phase of the polyphenylene ether has conspicuous effects on impact strength and is desirably 0.01-10μ, preferably 0.05-5μ, more preferably 0.05-3μ, further preferably 0.1-2μ, the most preferably 0.1-1.8μ.

As explained above, the resin composition of this invention comprises a dispersing phase consisting polyphenylene ether, a crystalline thermoplastic resin and a mutual compatibilizer which is compatible with both or either of the two phases.

Compatible with both or either one of said two phases and impact strength of this composition which has not been able to improve by conventional technique can be improved without substantially no reduction in heat resistance by specifying particle diameter of the polyphenylene ether dispers phase.

Especially, hitherto no attention has been given to the fact that diameter of dispersed particles in a composition containing polyphenylene ether has a great effect on impact strength and so rubber component must have been used in a large amount in order to improve impact strength which is accompanied by reduction of heat resistance.

This invention can provide more readily a novel composition having a superior balance between impact strength and heat resistance by specifying particle diameter of disperse phase of polyphenylene ether, using a mutual compatibilizer which serves to obtain the specific particle diameter and specifying molecular weight of polyphenylene ether.

The novel composition provided by this invention can be processed to shaped articles, sheet, film, tube, coating material by processing methods employed for thermoplastic resins such as injection molding, extrusion molding, etc. to afford articles excellent in balance of properties such as heat resistance, impact strength, processability, dimension stability, etc.

We claim:
1. A thermoplastic resin composition consisting essentially of:
(A) a dispersing phase of 1-65 percent by weight of polyphenylene ether having a reduced viscosity of 0.4-0.60 measured in chloroform solution at 25° C. obtained by oxidation polymerization of at least one phenyl compound represented by the formula:

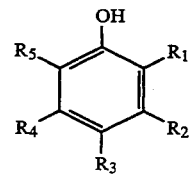

wherein $R_1$, $R_2$, $R_3$, $R_4$, and $R_5$ each represent a hydrogen atom, a halogen atom or a substituted or unsubstituted hydrocarbon residue wherein at least one of $R_1$, $R_2$, $R_3$, $R_4$, and $R_5$ is a hydrogen atom;
(B) a matrix phase of 35-98 percent by weight of crystalline thermoplastic resin; and
(C) 0.1-50 percent by weight of a mutual compatibilizer compatible with (A) and (B),
wherein the average particle size diameter in said dispersing phase (A) is 0.01-10 microns, said thermoplastic resin matrix phase (B) comprises at least one resin selected from the group consisting of polyethylene, polypropylene, polyethylene terephthalate, polybutylene terephthalate, polyacetal and polyether ether ketone, said mutual compatibilizer (C) is at least one member selected from the group consisting of (C)(1) a monomeric compound containing, in the molecule, at least one group selected from the group consisting of carboxyl group, acid anhydride group, acid amide group, imide group, carboxylate group, amino group, isocyanate group, oxazoline ring-containing group and hydroxyl group, (C)(2) an epoxy compound and (C)(3) a rubber material modified with at least one compound selected from (C)(1) and (C)(2), and said rubber material is a natural or synthetic polymer material which is elastic at room temperature.

2. A thermoplastic resin composition according to claim 1, wherein the thermoplastic composition is obtained by kneading firstly said dispersing phase (A) with said mutual compatibilizer (C) and then thereafter said matrix phase (B) therewith.

3. A resin composition according to claim 1, wherein said dispersing phase (A) said polyphenylene ether has a reduced viscosity of 0.45–0.55.

4. A resin composition according to claim 1, wherein the rubber material is modified with at least one compound selected from compounds containing, in the molecule, at least one of carboxyl group, acid anhydride group, acid amide group, imide group, carboxylate group, amino group, isocyanate group, oxazoline ring-containing group and hydroxyl group.

5. A resin composition according to claim 1, wherein the compound containing, in the molecule, at least one of carboxyl group, acid anhydride group, acid amide group, imide group or amino group is acrylic acid, maleic acid, fumaric acid, maleic anhydride, maleic hydrazide or maleimide.

6. A resin composition according to claim 1, wherein said epoxy compound C(2) is at least one member selected from the group consisting of (i) a copolymer comprising ethylene and an unsaturated epoxy compound and (ii) a copolymer comprising ethylene, an unsaturated epoxy compound and an ethylenically unsaturated compound having more than two carbon atoms.

7. A resin composition according to claim 1, wherein the rubber material is modified with (C)(2).

8. A resin composition according to claim 1, wherein the average diameter of particles in said dispersing phase (A) is 0.05–5μ.

9. A resin composition according to claim 1, wherein the average diameter of particles in said dispersing phase (A) is 0.05–3μ.

10. A resin composition according to claim 1, wherein the average diameter of particles in said dispersing phase (A) is 0.1–2μ.

11. A resin composition according to claim 1, wherein the average diameter of particles in said dispersing phase is 0.1–1.8μ.

12. A resin composition according to claim 1, wherein the epoxy compound (C)(2) is an unsaturated epoxy compound.

13. A thermoplastic resin composition according to claim 1, wherein the epoxy compound (C)(2) is an epoxy resin.

14. A thermoplastic resin composition according to claim 1, wherein said rubber material is ethylene-propylene rubber.

15. A thermoplastic resin composition consisting essentially of:

(A) a dispersing phase comprising 1–65 percent by weight of polyphenylene ether having a reduced viscosity of 0.4–0.60 measured in chloroform solution at 25° C. obtained by oxidation polymerization of at least one phenyl compound represented by the formula:

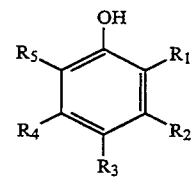

wherein $R_1$, $R_2$, $R_3$, $R_4$ and $R_5$ each represent a hydrogen atom, a halogen atom or a substituted or unsubstituted hydrocarbon residue, wherein at least one of $R_1$, $R_2$, $R_3$, $R_4$ and $R_5$ is a hydrogen atom and that the average particle size diameter in the dispersing phase is 0.01–10 microns;

(B) a matrix phase of 35–98 percent by weight of crystalline thermoplastic polyester;

(C) 0.1–50% by weight of a mutual compatibilizer selected from the group consisting of acid anhydrides;

1–50 parts by weight of (D) glass fibers having an aspect ratio of 10 or more in a shaped article or (E) talc having an average particle diameter of 10μ or less, based on 100 parts by weight of the thermoplastic composition; and (F) ethylene-propylene rubber.

* * * * *